(12) United States Patent
Asaro et al.

(10) Patent No.: US 11,741,019 B2
(45) Date of Patent: *Aug. 29, 2023

(54) MEMORY POOLS IN A MEMORY MODEL FOR A UNIFIED COMPUTING SYSTEM

(71) Applicants: Advanced Micro Devices, Inc., Santa Clara, CA (US); ATI Technologies ULC, Markham (CA)

(72) Inventors: Anthony Asaro, Markham (CA); Kevin Normoyle, Los Gatos, CA (US); Mark Hummel, Franklin, MA (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/471,552

(22) Filed: Sep. 10, 2021

(65) Prior Publication Data

US 2021/0406196 A1 Dec. 30, 2021

Related U.S. Application Data

(63) Continuation of application No. 16/443,385, filed on Jun. 17, 2019, now Pat. No. 11,119,944, which is a continuation of application No. 15/695,683, filed on Sep. 5, 2017, now Pat. No. 10,324,860, which is a continuation of application No. 15/254,466, filed on Sep. 1, 2016, now abandoned, which is a continuation of application No. 14/833,850, filed on Aug. 24, (Continued)

(51) Int. Cl.
*G06F 12/10* (2016.01)
*G06F 12/1036* (2016.01)
*G06F 12/08* (2016.01)
*G06F 12/06* (2006.01)
*G06F 12/02* (2006.01)
*G06F 12/109* (2016.01)

(52) U.S. Cl.
CPC ...... *G06F 12/1036* (2013.01); *G06F 12/0284* (2013.01); *G06F 12/0646* (2013.01); *G06F 12/08* (2013.01); *G06F 12/109* (2013.01); *G06F 12/10* (2013.01); *G06F 2212/1012* (2013.01); *G06F 2212/152* (2013.01); *G06F 2212/656* (2013.01); *G06F 2212/657* (2013.01)

(58) Field of Classification Search
CPC ............ G06F 12/1036; G06F 12/0284; G06F 12/0646; G06F 12/08; G06F 12/109; G06F 12/10; G06F 2212/1012; G06F 2212/152; G06F 2212/656; G06F 2212/657

See application file for complete search history.

(56) References Cited

U.S. PATENT DOCUMENTS 5,721,858 A 2/1998 White et al.
5,956,754 A 9/1999 Kimmel
(Continued)

*Primary Examiner* — Hiep T Nguyen
(74) *Attorney, Agent, or Firm* — Volpe Koenig

(57) ABSTRACT

A method and system for allocating memory to a memory operation executed by a processor in a computer arrangement having a plurality of processors. The method includes receiving a memory operation from a processor that references an address in a shared memory, mapping the received memory operation to at least one virtual memory pool to produce a mapping result, and providing the mapping result to the processor.

20 Claims, 10 Drawing Sheets

Related U.S. Application Data 2015, now Pat. No. 9,448,930, which is a continuation of application No. 13/724,879, filed on Dec. 21, 2012, now Pat. No. 9,116,809.

(60) Provisional application No. 61/617,405, filed on Mar. 29, 2012.

(56) References Cited

U.S. PATENT DOCUMENTS

| | | |
|---|---|---|
| 7,587,721 B2 | 9/2009 | Schmidt et al. |
| 7,908,454 B2 | 3/2011 | Leung et al. |
| 8,531,471 B2 | 9/2013 | Chen et al. |
| 2004/0230762 A1 | 11/2004 | Allen et al. |
| 2006/0069878 A1 | 3/2006 | Aguilar, Jr. et al. |
| 2006/0143595 A1 | 6/2006 | Dostert et al. |
| 2007/0076008 A1 | 4/2007 | Osborne |
| 2007/0020427 A1 | 8/2007 | Gaiarsa et al. |
| 2009/0210649 A1 | 8/2009 | Wan et al. |
| 2010/0077155 A1 | 3/2010 | Cohen |
| 2011/0113210 A1 | 5/2011 | Klapman et al. |
| 2011/0161620 A1 | 6/2011 | Kaminski et al. |
| 2011/0185129 A1 | 7/2011 | Landau et al. |
| 2012/0179889 A1 | 7/2012 | Krauss |
| 2012/0221765 A1 | 8/2012 | Yoo et al. |
| 2012/0272241 A1 | 10/2012 | Nonaka et al. |
| 2013/0159664 A1* | 6/2013 | Blinzer ............... G06F 9/3004 711/E12.059 |
| 2013/0262784 A1 | 10/2013 | Asaro et al. |
| 2014/0049551 A1 | 2/2014 | Rao et al. |
| 2014/0306972 A1 | 10/2014 | Zhou |
| 2015/0370721 A1 | 12/2015 | Morris et al. |

\* cited by examiner

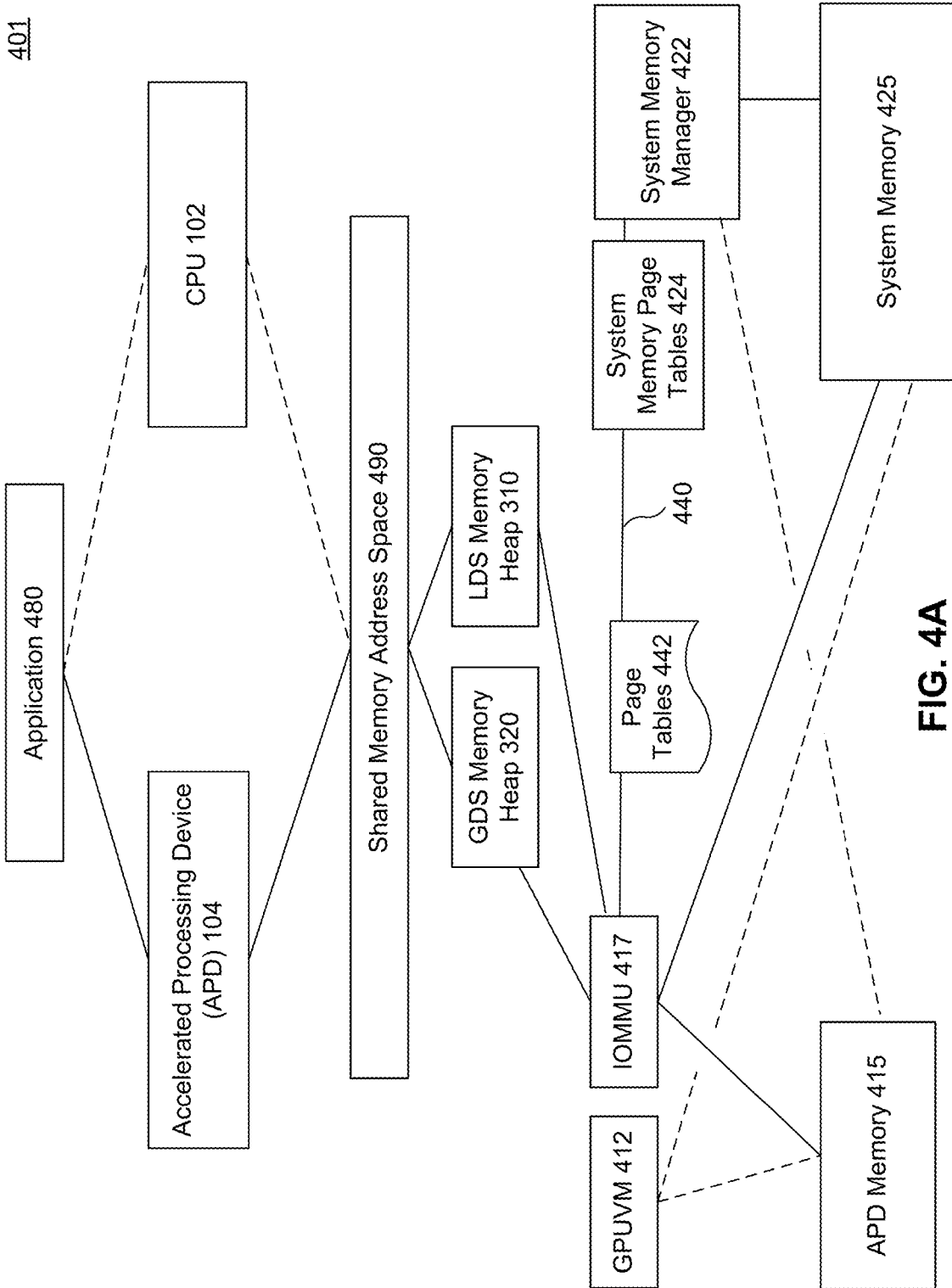

MEMORY POOLS IN A MEMORY MODEL FOR A UNIFIED COMPUTING SYSTEM

CROSS REFERENCE TO RELATED APPLICATIONS

This application is a continuation of U.S. patent application Ser. No. 16/443,385, filed Jun. 17, 2019, which is a continuation of U.S. patent application Ser. No. 15/695,683, filed on Sep. 5, 2017, which issued on Jun. 18, 2019 as U.S. Pat. No. 10,324,860, which is a continuation of U.S. patent application Ser. No. 15/254,466, filed on Sep. 1, 2016, which is a continuation of U.S. patent application Ser. No. 14/833,850, filed on Aug. 24, 2015, which issued on Sep. 20, 2016 as U.S. Pat. No. 9,448,930, which is a continuation of U.S. patent application Ser. No. 13/724,879, filed on Dec. 21, 2012, which issued on Aug. 25, 2015 as U.S. Pat. No. 9,116,809, which claims the benefit of U.S. Provisional Application No. 61/617,405, filed on Mar. 29, 2012, which are incorporated herein by reference as if fully set forth.

FIELD OF INVENTION

The present invention is generally directed to computer systems. More particularly, the present invention is directed towards an architecture for unifying the computational components within a computer system.

BACKGROUND

The desire to use a graphics processing unit (GPU) for general computation has become much more pronounced recently due to the GPU's exemplary performance per unit power and/or cost. The computational capabilities for GPUs, generally, have grown at a rate exceeding that of the corresponding central processing unit (CPU) platforms. This growth, coupled with the explosion of the mobile computing market (e.g., notebooks, mobile smart phones, tablets, etc.) and its necessary supporting server/enterprise systems, has been used to provide a specified quality of desired user experience. Consequently, the combined use of CPUs and GPUs for executing workloads with data parallel content is becoming a volume technology.

However, GPUs have traditionally operated in a constrained programming environment, available primarily for the acceleration of graphics. These constraints arose from the fact that GPUs did not have as rich a programming ecosystem as CPUs. Their use, therefore, has been mostly limited to two dimensional (2-D) and three dimensional (3-D) graphics and a few leading edge multimedia applications, which are already accustomed to dealing with graphics and video application programming interfaces (APIs).

With the advent of multi-vendor supported OpenCL® and DirectCompute®, standard APIs and supporting tools, the limitations of the GPUs in traditional applications has been extended beyond traditional graphics. Although OpenCL and DirectCompute are a promising start, there are many hurdles remaining to creating an environment and ecosystem that allows the combination of a CPU and a GPU to be used as fluidly as the CPU for most programming tasks.

Existing computing systems often include multiple processing devices. For example, some computing systems include both a CPU and a GPU on separate chips (e.g., the CPU might be located on a motherboard and the GPU might be located on a graphics card) or in a single chip package. Both of these arrangements, however, still include significant challenges associated with (i) efficient scheduling, (ii) programming model, (iii) compiling to multiple target instruction set architectures, (iv) providing quality of service (QoS) guarantees between processes, (ISAs), and (v) separate memory systems, —all while minimizing power consumption.

In conventional systems (e.g., CPU and GPU computing systems), programmers were required to explicit marshal memory between separate address spaces associated with each of the client devices. This, among other things, introduced a constraint to the programmer.

SUMMARY

What is needed, therefore, is a method and system providing a memory configured to operate in a multi-client computing system environment that frees the programmer from the above-noted constraint. More particularly, what is needed is a region of memory allocated from a single memory space with common access and storage properties.

Although GPUs, accelerated processing units (APUs), and general purpose use of the graphics processing unit (GPGPU) are commonly used terms in this field, the expression "accelerated processing device (APD)" is considered to be a broader expression. For example, APD refers to any cooperating collection of hardware and/or software that performs those functions and computations associated with accelerating graphics processing tasks, data parallel tasks, or nested data parallel tasks in an accelerated manner compared to conventional CPUs, conventional GPUs, software and/or combinations thereof.

More specifically, embodiments of the invention, in certain circumstances, provide a method and apparatus for allocating memory to a memory operation executed by a processor in a computer arrangement having an APD configured for unified operation with a CPU. The method includes receiving a memory operation from a processor and mapping the memory operation to one of a plurality of memory heaps. The mapping produces a mapping result. The method also includes providing the mapping result to the processor.

Further features and advantages of the invention, as well as the structure and operation of various embodiments of the invention, are described in detail below with reference to the accompanying drawings. The invention is not limited to the specific embodiments described herein. The embodiments are presented for illustrative purposes only and so that readers will have multiple views enabling better perception of the invention, which is broader than any particular embodiment. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate embodiments and principles of the invention. Together with the text description, they explain the principles of the invention and enable a person skilled in the pertinent art to make and use the invention. Various embodiments of the present invention are described below with reference to the drawings, wherein like reference numerals are used to refer to like elements throughout.

FIG. 4A is a block diagram illustrating aspects of global data store (GDS) and local data store (LDS) memory heaps, according to an embodiment of the invention.

DETAILED DESCRIPTION

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1A:
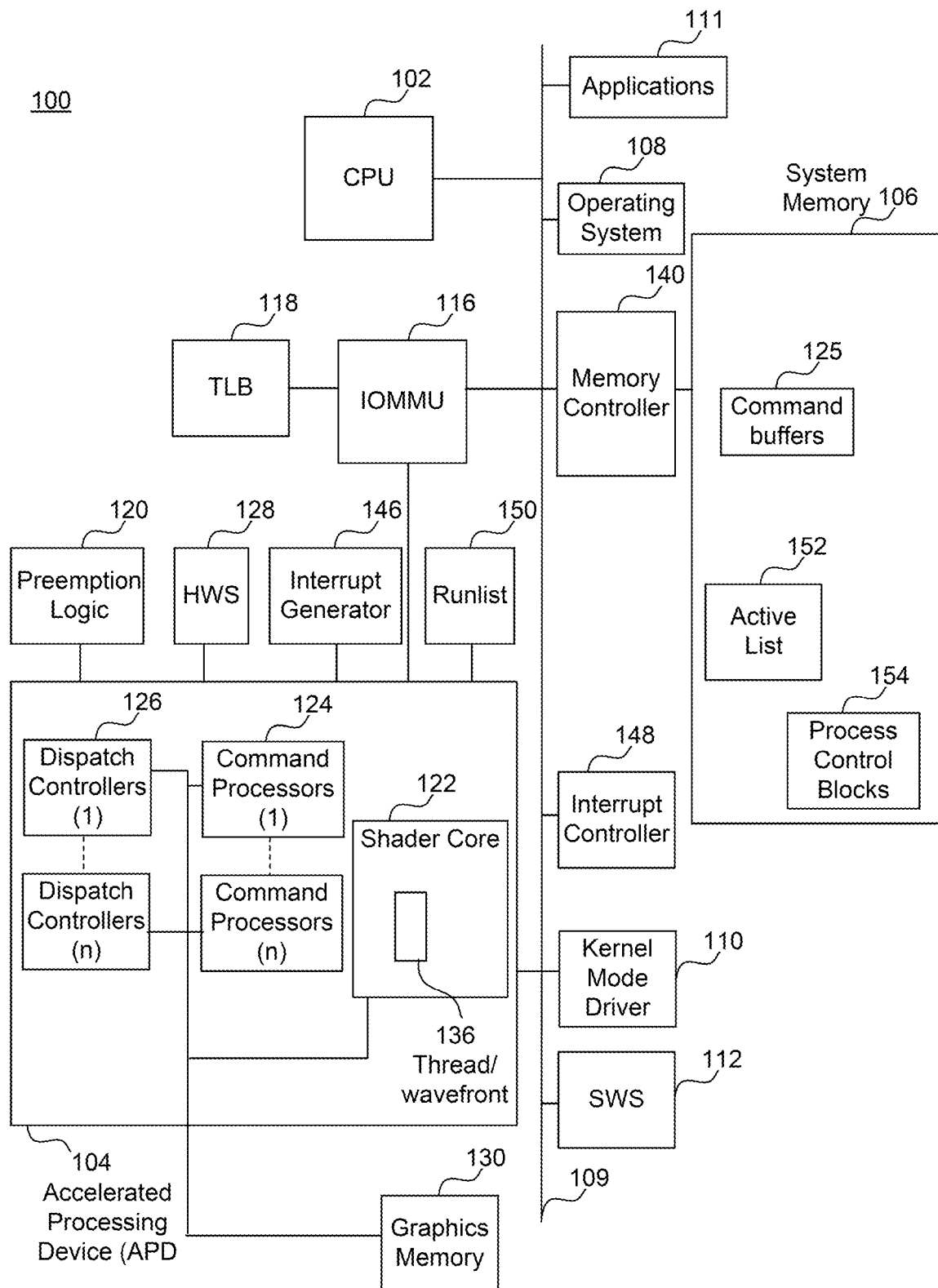
FIG. 1A is a block diagram of an illustrative processing system in accordance with embodiments of the invention.

FIG. 1A is an exemplary illustration of a unified computing system 100 including two processors, a CPU 102 and an APD 104. CPU 102 can include one or more single or multi core CPUs. In one embodiment of the present invention, the system 100 is formed on a single silicon die or package, combining CPU 102 and APD 104 to provide a unified programming and execution environment. This environment enables the APD 104 to be used as fluidly as the CPU 102 for some programming tasks. However, it is not an absolute requirement of this invention that the CPU 102 and APD 104 be formed on a single silicon die. In some embodiments, it is possible for CPU 102 and APD 104 to be formed separately and mounted on the same or different substrates.

In one example, system 100 also includes a memory 106, an operating system 108, and a communication infrastructure 109. The operating system 108 and the communication infrastructure 109 are discussed in greater detail below.

The system 100 also includes a kernel mode driver (KMD) 110, a software scheduler (SWS) 112, and a memory management unit 116, such as input/output memory management unit (IOMMU). Components of system 100 can be implemented as hardware, firmware, software, or any combination thereof. A person of ordinary skill in the art will appreciate that system 100 may include one or more software, hardware, and firmware components in addition to, or different from, that shown in the embodiment shown in FIG. 1A.

In one example, a driver, such as KMD 110, typically communicates with a device through a computer bus or communications subsystem to which the hardware connects. When a calling program invokes a routine in the driver, the driver issues commands to the device. Once the device sends data back to the driver, the driver may invoke routines in the original calling program. In one example, drivers are hardware-dependent and operating-system-specific. They usually provide the interrupt handling required for any necessary asynchronous time-dependent hardware interface.

Device drivers, particularly on modern Microsoft Window® platforms, can run in kernel-mode (Ring 0) or in user-mode (Ring 3). The primary benefit of running a driver in user mode is improved stability, since a poorly written user mode device driver cannot crash the system by overwriting kernel memory. On the other hand, user/kernel-mode transitions usually impose a considerable performance overhead, thereby prohibiting user mode-drivers for low latency and high throughput requirements. Kernel space can be accessed by user module only through the use of system calls. End user programs like the UNIX shell or other GUI based applications are part of the user space. These applications interact with hardware through kernel supported functions.

CPU 102 can include (not shown) one or more of a control processor, field programmable gate array (FPGA), application specific integrated circuit (ASIC), or digital signal processor (DSP). CPU 102, for example, executes the control logic, including the operating system 108, KMD 110, SWS 112, and applications 111, that control the operation of computing system 100. In this illustrative embodiment, CPU 102, according to one embodiment, initiates and controls the execution of applications 111 by, for example, distributing the processing associated with that application across the CPU 102 and other processing resources, such as the APD 104.

APD 104, among other things, executes commands and programs for selected functions, such as graphics operations and other operations that may be, for example, particularly suited for parallel processing. In general, APD 104 can be frequently used for executing graphics pipeline operations, such as pixel operations, geometric computations, and rendering an image to a display. In various embodiments of the present invention, APD 104 can also execute compute processing operations (e.g., those operations unrelated to graphics such as, for example, video operations, physics simulations, computational fluid dynamics, etc.), based on commands or instructions received from CPU 102.

For example, commands can be considered as special instructions that are not typically defined in the ISA. A command may be executed by a special processor such a dispatch processor, command processor, or network controller. On the other hand, instructions can be considered, for example, a single operation of a processor within a computer architecture. In one example, when using two sets of ISAs, some instructions are used to execute x86 programs and some instructions are used to execute kernels on an APD unit.

In an illustrative embodiment, CPU 102 transmits selected commands to APD 104. These selected commands can include graphics commands and other commands amenable to parallel execution. These selected commands, that can also include compute processing commands, can be executed substantially independently from CPU 102.

APD 104 can include its own compute units (not shown), such as, but not limited to, one or more SIMD processing cores. As referred to herein, a SIMD is a pipeline, or programming model, where a kernel is executed concurrently on multiple processing elements each with its own data and a shared program counter. All processing elements execute an identical set of instructions. The use of predication enables work-items to participate or not for each issued command.

In one example, each APD 104 compute unit can include one or more scalar and/or vector floating-point units and/or arithmetic and logic units (ALUs). The APD compute unit can also include special purpose processing units (not shown), such as inverse-square root units and sine/cosine units. In one example, the APD compute units are referred to herein collectively as shader core 122.

Having one or more SIMDs, in general, makes APD 104 ideally suited for execution of data-parallel tasks such as those that are common in graphics processing.

Some graphics pipeline operations, such as pixel processing, and other parallel computation operations, can require that the same command stream or compute kernel be performed on streams or collections of input data elements. Respective instantiations of the same compute kernel can be executed concurrently on multiple compute units in shader core 122 in older to process such data elements in parallel. As referred to herein, for example, a compute kernel is a function containing instructions declared in a program and executed on an APD. This function is also referred to as a kernel, a shader, a shader program, or a program.

In one illustrative embodiment, each compute unit (e.g., SIMD processing core) can execute a respective instantiation of a particular work-item to process incoming data. A work-item is one of a collection is of parallel executions of a kernel invoked on a device by a command. A work-item can be executed by one or more processing elements as part of a work-group executing on a compute unit.

A work-item is distinguished from other executions within the collection by its global ID and local ID. In one example, a subset of work-items in a workgroup that execute simultaneously together on a SIMD can be referred to as a wavefront 136. The width of a wavefront is a characteristic of the hardware of the compute unit (e.g., SIMD processing core). As referred to herein, a workgroup is a collection of related work-items that execute on a single compute unit. The work-items in the group execute the same kernel and share local memory and work-group barriers.

In the exemplary embodiment, all wavefronts from a workgroup are processed on the same SIMD processing core. Instructions across a wavefront are issued one at a time, and when all work-items follow the same control flow, each work-item executes the same program. Wavefronts can also be referred to as warps, vectors, or threads.

An execution mask and work-item predication are used to enable divergent control flow within a wavefront, where each individual work-item can actually take a unique code path through the kernel. Partially populated wavefronts can be processed when a full set of work-items is not available at wavefront start time. For example, shader core 122 can simultaneously execute a predetermined number of wavefronts 136, each wavefront 136 comprising a multiple work-items.

Within the system 100, APD 104 includes its own memory, such as graphics memory 130 (although memory 130 is not limited to graphics only use). Graphics memory 130 provides a local memory for use during computations in APD 104. Individual compute units (not shown) within shader core 122 can have their own local data store (not shown). In one embodiment, APD 104 includes access to local graphics memory 130, as well as access to the memory 106. In another embodiment, APD 104 can include access to dynamic random access memory (DRAM) or other such memories (not shown) attached directly to the APD 104 and separately from memory 106.

In the example shown, APD 104 also includes one or "n" number of command processors (CPs) 124. CP 124 controls the processing within APD 104. CP 124 also retrieves commands to be executed from command buffers 125 in memory 106 and coordinates the execution of those commands on APD 104.

In one example, CPU 102 inputs commands based on applications 111 into appropriate command buffers 125. As referred to herein, an application is the combination of the program parts that will execute on the compute units within the CPU and APD.

A plurality of command buffers 125 can be maintained with each process scheduled for execution on the APD 104.

CP 124 can be implemented in hardware, firmware, or software, or a combination thereof. In one embodiment, CP 124 is implemented as a reduced instruction set computer (RISC) engine with microcode for implementing logic including scheduling logic.

APD 104 also includes one or "n" number of dispatch controllers (DCs) 126. In the present application, the term dispatch refers to a command executed by a dispatch controller that uses the context state to initiate the start of the execution of a kernel for a set of work groups on a set of compute units. DC 126 includes logic to initiate workgroups in the shader core 122. In some embodiments, DC 126 can be implemented as part of CP 124.

System 100 also includes a hardware scheduler (HWS) 128 for selecting a process from a ran list 150 for execution on APD 104. HWS 128 can select processes from run list 150 using round robin methodology, priority level, or based on other scheduling policies. The priority level, for example, can be dynamically determined. HWS 128 can also include functionality to manage the run list 150, for example, by adding new processes and by deleting existing processes from run-list 150. The run list management logic of HWS 128 is sometimes referred to as a run list controller (RLC).

In various embodiments of the present invention, when HWS 128 initiates the execution of a process from run list 150, CP 124 begins retrieving and executing commands from the corresponding command buffer 125. In some instances, CP 124 can generate one or more commands to be executed within APD 104, which correspond with commands received from CPU 102. In one embodiment, CP 124, together with other components, implements a prioritizing and scheduling of commands on APD 104 in a manner that improves or maximizes the utilization of the resources of APD 104 resources and/or system 100.

APD 104 can have access to, or may include, an interrupt generator 146. Interrupt generator 146 can be configured by APD 104 to interrupt the operating system 108 when interrupt events, such as page faults, are encountered by APD 104. For example, APD 104 can rely on interrupt generation logic within IOMMU 116 to create the page fault interrupts noted above.

APD 104 can also include preemption and context switch logic 120 for preempting a process currently running within shader core 122. Context switch logic 120, for example, includes functionality to stop the process and save its current state (e.g., shades core 122 state, and CP 124 state).

As referred to herein, the term state can include an initial state, an intermediate state, and/or a final state. An initial state is a starting point for a machine to process an input data set according to a programming order to create an output set of data. There is an intermediate state, for example, that needs to be stored at several points to enable the processing to make forward progress. This intermediate state is sometimes stored to allow a continuation of execution at a later time when interrupted by some other process. There is also final state that can be recorded as part of the output data set.

Preemption and context switch logic 120 can also include logic to context switch another process into the APD 104. The functionality to context switch another process into running on the APD 104 may include instantiating the process, for example, through the CP 124 and DC 126 to run on APD 104, restoring any previously saved state for that process, and starting its execution.

Memory 106 can include non-persistent memory such as DRAM (not shown). Memory 106 can store, e.g., processing logic instructions, constant values, and variable values during execution of portions of applications or other processing logic. For example, in one embodiment, parts of control logic to perform one or more operations on CPU 102 can reside within memory 106 during execution of the respective portions of the operation by CPU 102.

During execution, respective applications, operating system functions, processing logic commands, and system software can reside in memory 106. Control logic commands fundamental to operating system 108 will generally reside in memory 106 during execution. Other software commands, including, for example, kernel mode driver 110 and software scheduler 112 can also reside in memory 106 during execution of system 100.

In this example, memory 106 includes command buffers 125 that are used by CPU 102 to send commands to APD 104. Memory 106 also contains process lists and process information (e.g., active list 152 and process control blocks 154). These lists, as well as the information, are used by scheduling software executing on CPU 102 to communicate scheduling information to APD 104 and/or related scheduling hardware. Access to memory 106 can be managed by a memory controller 140, which is coupled to memory 106. For example, requests from CPU 102, or from other devices, for reading from or for writing to memory 106 are managed by the memory controller 140.

Referring back to other aspects of system 100, IOMMU 116 is a multi-context memory management unit.

As used herein, context can be considered the environment within which the kernels execute and the domain in which synchronization and memory management is defined. The context includes a set of devices, the memory accessible to those devices, the corresponding memory properties and one or more command-queues used to schedule execution of a kernel(s) or operations on memory objects.

Referring back to the example shown in FIG. 1A, IOMMU 116 includes logic to perform virtual to physical address translation for memory page access for devices including APD 104. IOMMU 116 may also include logic to generate interrupts, for example, when a page access by a device such as APD 104 results in a page fault. IOMMU 116 may also include, or have access to, a translation lookaside buffer (TLB) 118. TLB 118, as an example, can be implemented in a content addressable memory (CAM) to accelerate translation of logical (i.e., virtual) memory addresses to physical memory addresses for requests made by APD 104 for data in memory 106.

In the example shown, communication infrastructure 109 interconnects the components of system 100 as needed. Communication infrastructure 109 can include (not shown) one or more of a peripheral component interconnect (PCI) bus, extended PCI (PCI-E) bus, advanced microcontroller bus architecture (AMBA) bus, advanced graphics port (AGP), or other such communication infrastructure. Communications infrastructure 109 can also include an Ethernet, or similar network, or any suitable physical communications infrastructure that satisfies an application's data transfer rate requirements. Communication infrastructure 109 includes the functionality to interconnect components including components of computing system 100.

In this example, operating system 108 includes functionality to manage the hardware components of system 100 and to provide common services. In various embodiments, operating system 108 can execute on CPU 102 and provide common services. These common services can include, for example, scheduling applications for execution within CPU 102, fault management, interrupt service, as well as processing the input and output of other applications.

In some embodiments, based on interrupts generated by an interrupt controller, such as interrupt controller 148, operating system 108 invokes an appropriate interrupt handling routine. For example, upon detecting a page fault interrupt, operating system 108 may invoke an interrupt handler to initiate loading of the relevant page into memory 106 and to update corresponding page tables.

Operating system 108 may also include functionality to protect system 100 by ensuring that access to hardware components is mediated through operating system managed kernel functionality. In effect, operating system 108 ensures that applications, such as applications 111, run on CPU 102 in user space. Operating system 108 also ensures that applications 111 invoke kernel functionality provided by the operating system to access hardware and/or input/output functionality.

By way of example, applications 111 include various programs or commands to perform user computations that are also executed on CPU 102. CPU 102 can seamlessly send selected commands for processing on the APD 104. In one example, KMD 110 implements an application program interface (API) through which CPU 102, or applications executing on CPU 102 or other logic, can invoke APD 104 functionality. For example, KMD 110 can enqueue commands from CPU 102 to command buffers 125 from which APD 104 will subsequently retrieve the commands. Additionally, KMD 110 can, together with SWS 112, perform scheduling of processes to be executed on APD 104. SWS 112, for example, can include logic to maintain a prioritized list of processes to be executed on the APD.

In other embodiments of the present invention, applications executing on CPU 102 can entirely bypass KMD 110 when enqueuing commands.

In some embodiments, SWS 112 maintains an active list 152 in memory 106 of processes to be executed on APD 104. SWS 112 also selects a subset of the processes in active list 152 to be managed by HWS 128 in the hardware. Information relevant for running each process on APD 104 is communicated from CPU 102 to APD 104 through process control blocks (PCB) 154.

Processing logic for applications, operating system, and system software can include commands specified in a programming language such as C and/or in a hardware description language such as Verilog, RTL, or netlists, to enable ultimately configuring a manufacturing process through the generation of maskworks/photomasks to generate a hardware device embodying aspects of the invention described herein.

Computing system 100 can include one or more input interfaces, non-volatile storage, one or more output interfaces, network interfaces, and one or more displays or display interfaces.

Figure 1B:
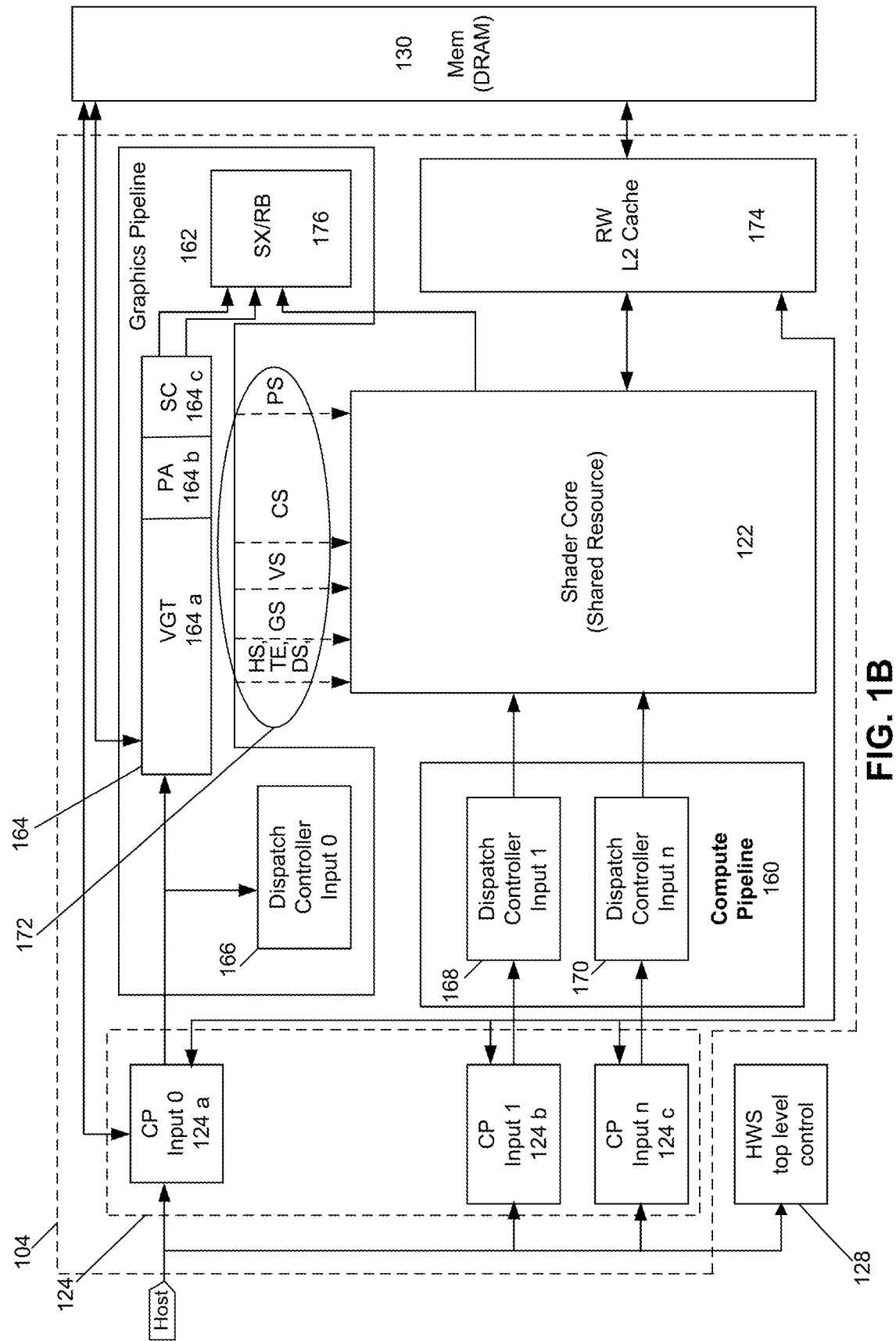
FIG. 1B is a block diagram of the graphics processor illustrated in FIG. 1A, in accordance with embodiments of the invention.

FIG. 1B is an embodiment showing a more detailed illustration of APD 104 shown in FIG. 1A. In FIG. 1B, CP 124 can include CP pipelines 124a, 124b, and 124c. CP 124 can be configured to process the command lists that are provided as inputs from command buffers 125, shown in FIG. 1A. In the exemplary operation of FIG. 1B, CP input 0 (124a) is responsible for driving commands into a graphics pipeline 162. CP inputs 1 and 2 (124b and 124c) forward commands to a compute pipeline 160. Also provided is a controller mechanism 166 for controlling operation of HWS 128.

In FIG. 1B, graphics pipeline 162 can include a set of blocks, referred to herein as ordered pipeline 164. As an example, ordered pipeline 164 includes a vertex group translator (VGT) 164a, a primitive assembler (PA) 164b, a scan converter (SC) 164c, and a shader-export, render-back unit (SX/RB) 176. Each block within ordered pipeline 164 may represent a different stage of graphics processing within graphics pipeline 162. Ordered pipeline 164 can be a fixed function hardware pipeline. Other implementations can be used that would also be within the spirit and scope of the present invention.

Although only a small amount of data may be provided as an input to graphics pipeline 162, this data will be amplified by the time it is provided as an output from graphics pipeline 162. Graphics pipeline 162 also includes DC 166 for counting through ranges within work-item groups received from CP pipeline 124a. Compute work submitted through DC 166 is semi-synchronous with graphics pipeline 162.

Compute pipeline 160 includes shader DCs 168 and 170. Each of the DCs 168 and 170 is configured to count through compute ranges within work groups received from CP pipelines 124b and 124c.

The DCs 166, 168, and 170, illustrated in FIG. 1B, receive the input ranges, break the ranges down into workgroups, and then forward the workgroups to shader core 122.

Since graphics pipeline 162 is generally a fixed function pipeline, it is difficult to save and restore its state, and as a result, the graphics pipeline 162 is difficult to context switch. Therefore, in most cases context switching, as discussed herein, does not pertain to context switching among graphics processes. An exception is for graphics work in shader core 122, which can be context switched.

After the processing of work within graphics pipeline 162 has been completed, the completed work is processed through a render back unit 176, which does depth and color calculations, and then writes its final results to memory 130.

Shader core 122 can be shared by graphics pipeline 162 and compute pipeline 160. Shader core 122 can be a general processor configured to run wavefronts. In one example, all work within compute pipeline 160 is processed within shader core 122. Shader core 122 runs programmable software code and includes various forms of data, such as state data.

A disruption in the QoS occurs when all work-items are unable to access APD resources. Embodiments of the present invention facilitate efficiently and simultaneously launching two or more tasks to resources within APD 104, enabling all work-items to access various APD resources. In one embodiment, an APD input scheme enables all work-items to have access to the APD's resources in parallel by managing the APD's workload. When the APD's workload approaches maximum levels, (e.g., during attainment of maximum I/O rates), this APD input scheme assists in that otherwise unused processing resources can be simultaneously utilized in many scenarios. A serial input stream, for example, can be abstracted to appear as parallel simultaneous inputs to the APD.

By way of example, each of the CPs 124 can have one or more tasks to submit as inputs to other resources within APD 104, where each task can represent multiple wavefronts. After a first task is submitted as an input, this task may be allowed to ramp up, over a period of time, to utilize all the APD resources necessary for completion of the task. By itself, this first task may or may not reach a maximum APD utilization threshold. However, as other tasks are enqueued and are waiting to be processed within the APD 104, allocation of the APD resources can be managed to ensure that all of the tasks can simultaneously use the APD 104, each achieving a percentage of the APD's maximum utilization. This simultaneous use of the APD 104 by multiple tasks, and their combined utilization percentages, ensures that a predetermined maximum APD utilization threshold is achieved.

In embodiments described herein, methods and systems relating to hardware assisted, software managed task scheduling are provided. For example, embodiments described herein relate to an accelerated processing device controlling the scheduling, based on a set of priorities, and execution of a set of given processes. In an embodiment, the software maintains a list of processes to be run by the APD. Further, the APD maintains a subset list of processes wherein the APD controls the priority and execution of the subset list of processes without the need for intervention from the software. In this manner, the APD offloads a portion of the burden of the software to monitor APD utilization and control the execution of processes executed by the APD, thereby freeing software resources.

As used in this patent document, a unified computing system (USC) memory model broadly describes the permissible interactions of memory operations, e.g., load and store operations, from multiple threads operating in computing system 100 using CPU 102 and APD 104 described above.

In the UCS memory model, there is a shared memory, for example, shared memory address space 240, having a single unique virtual address for memory heaps mapped into the application. This property is independent of whether CPU 102 or APD 104 is granted access to the region. All memory heaps are accessible with a unique virtual address in the application address space, which allows pointers to be passed directly between the CPU 102 and APD 104 without modification.

As described in embodiments below, the UCS programming model provides memory resources and memory coherency between cooperating APD 104 and CPU 102 processing components using different memory heaps.

UCS also allows implementation flexibility for dynamic partitioning of the APD hardware coherent and local memory. This can be achieved in implementations that contain a APD probe filter that keeps track of all lines currently exported from the APD local memory. Cache lines that are never touched by the CPU do not have a footprint in the probe filter and have the same performance as local non-coherent APD memory.

As used typically herein, a "thread" is a program-ordered sequence of operations through a processing element. A thread can also be characterized as a single instance of a program execution with a unique data state. Examples of threads of different types include a CPU thread and a graphics processor (GP) thread. As used with some embodiments herein, CPU threads are conventional "x86" threads operating with a traditional x86 memory model using a conventional CPU, e.g., CPU 102 depicted in FIG. 1. As also used typically herein, a GP thread is a thread that executes on a graphics processor, e.g., APD 104.

Typically, a GP thread is a set of "work-items" across which the instructions of a "compute kernel" are applied in lock-step within a single SIMD processing core. An example of a "work-item" in an accelerated processing device includes an OpenCL style thread. As would be appreciated by one having skill in the relevant art(s), teachings herein can apply to any method of processing programmatic operations using one or more processing elements in one or more APDs, CPUs or other processing elements, e.g., "co-processors," etc.

An aspect of UCS is a virtual machine language technique, which is designed for parallel processing and can be translated on the fly into native machine language. Each UCS computational unit includes two types of cores. For convenience, as used herein, UCS virtual machine language is referred to as UCS Intermediate Language (UCSIL).

UCSIL is an intermediate language. All software visible mechanisms are described as UCSIL primitives. The implementation of UCSIL primitives by hardware will include primitives not described here. Separate documents may describe cache or buffer flushes, fences, arbitration points, cache states etc.

The UCSIL abstraction that runs on top of a virtual machine (VM), one goal of UCSIL being to abstract system hardware resources from the high level programming languages (HLL) and programmer, while not unduly restricting compiler/JIT/HW optimizations and allowing a range of possible HW instruction sets (ISA) and architectures. UCSIL threads may operate in one or more in workgroups, with shared access to a set of memory heaps via a shared memory address space.

Figure 2:
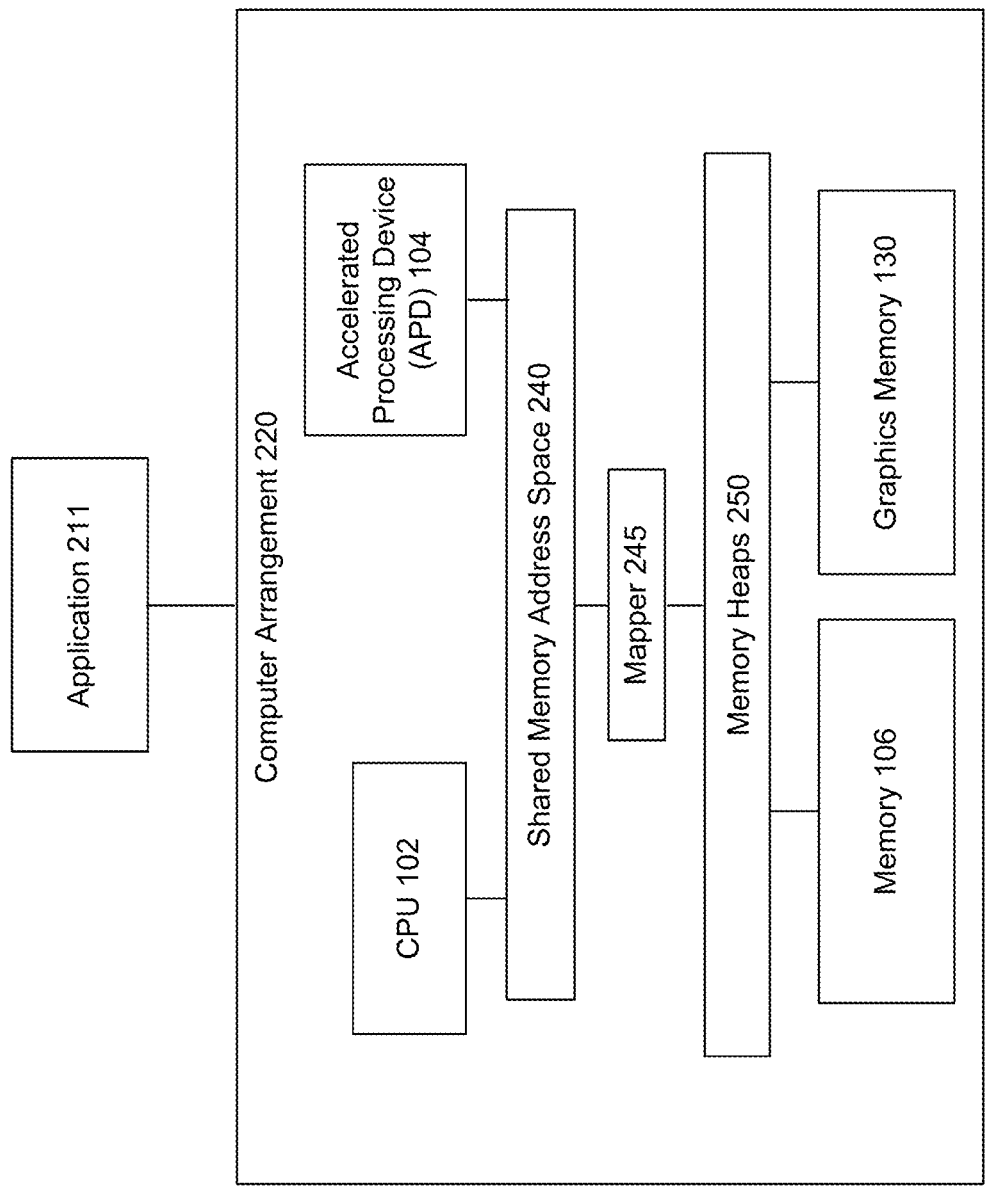
FIG. 2 is a block diagram of a computer arrangement in the unified computing system illustrated in FIGS. 1A and 1B, in accordance with embodiments of the invention.

By way of background, FIG. 2 is a block diagram of an example system architecture 200 in which embodiments of the present invention, or portions thereof, may be implemented. System architecture 200 includes application 211 coupled computer arrangement 220. In an embodiment, computer arrangement 220 has characteristics of unified computing system 100, described above. Some embodiments described herein describe aspects of a memory model for unified computing system 100 described above, e.g., a unified memory model. Computer arrangement 220 includes CPU 102, APD 104, shared memory address space 240, mapper 245, memory heaps 250, system memory 106 and graphics memory 130.

One aspect of the memory model for unified computing system 100 described herein is the use of memory heaps 250 to provide access to different portions of memory in computer arrangement 220. As used typically herein, a UCS "memory heap" refers to an approach to allocating physical memory (storage) resources in the UCS. More specifically, memory heaps 250 are virtual memory pools that can be mapped to physical memory pools. Examples of physical memory pools include system memory 106 and graphics memory 130. Because of characteristics of the UCS, different memory heaps are used to allocate memory resources to different processing elements using different approaches.

As used typically herein, a memory resource is an electronic device that stores data for an electronic computer. This memory resource can be either a physical memory resource or a virtual memory resource. It should be appreciated that memory resources, as used typically herein, includes caches, and other associated memory devices.

Computer arrangement 220 includes memory resources, including system memory 106 and graphics memory 130. System memory 106 is also known typically as CPU memory, and is directly accessible to, and associated with, CPU 102. Graphics memory 130, for example can be APD DRAM and is directly accessible to, and associated with, APD 104.

Generally speaking, in an embodiment, a method of providing memory to a memory operation operating in a computer arrangement having an APD 104 and CPU 102 processor is provided. A memory operation, for example from application 211, is received from a processor and the memory operation is mapped using mapper 245 to one of a plurality of memory heaps 250. The result of the mapping is provided to the processor. The processor uses the mapping result to perform the memory operation using memory resources.

Memory heaps used in embodiments described herein can have several general characteristics. Different characteristics allow memory heaps 250 to provide different services to computer arrangement 220. A non-limiting list of example characteristics C1-C8 is listed below:

C1. An example memory heap can be beneficially configured to access only one physical memory resource in the computer arrangement. Certain memory resources have higher performance capabilities than others, for example, graphics memory 130 has higher performance for certain types of operations. One example, of a memory heap configured to only access graphics memory 130, is the APD coherent memory heap discussed with the description of FIG. 4E below. Providing application 211 access to graphics memory 130 enables the beneficial acceleration of programming environments such as OpenCL, as noted above.

C2. An example memory heap can be beneficially configured to access more than one physical memory resource in the computer arrangement. One example, of a memory heap configured to access more than one physical memory resource in the computer arrangement, is the APD local memory heap discussed with the description of FIG. 4C below, such memory heap configured to access both graphics memory 130 and system memory 106. Providing access to multiple memory resources can beneficially allow a memory heap to perform memory operations in the UCS.

C3. An example memory heap can be beneficially configured to only accept memory operations from one type of processing element in the UCS, e.g., from either APD 104 or CPU 102. One example, of a memory heap configured to only accept memory operations from APD 104, is the APD local memory heap discussed with the description of FIG. 4C below. It should be noted that, as described with item C2 above, while only accepting memory operations from APD 104, the APD local memory heap can access both graphics memory 130 and system memory 106.

C4. An example memory heap can be beneficially configured to accept memory operations from multiple types of processing elements in the UCS, e.g., from both APD 104 and CPU 102. One example, of a memory heap configured to accept memory operations from both APD 104 and CPU 102, is the APD coherent memory heap discussed with the description of FIG. 4E below.

C5. Notwithstanding a memory heap capability to accept memory operations from multiple types of processing element as described with item C4 above, not all memory resources are accessible by all types of processing elements. For example, there can be memory regions exported by APD 104 that are only accessible by APD 104. If CPU 102 attempts to access to these regions, a "not-present fault" can result.

C6. Some memory heaps use different memory managing components in computer arrangement 220 to access the physical memory resources. The memory manager used for the memory heap to enable access to a physical memory resource can depend upon the processor from which the memory operation originates. For example, as discussed with the descriptions of FIGS. 4D and 4E below, for some memory heaps, either IOMMU 116 or GPUVM 412 can be used to access system memory 106, based on the processor from which a memory operation originates.

C7. Memory heaps that are accessible to multiple types of processing elements, e.g., as discussed with item C4 above, can also have different attributes applied to the mapped memory depending upon the processor from which the memory operation originates. For example, when accessed by a memory heap, memory in system memory 106 can be set to read-only for memory operations originating in APD 104, but be write-eligible for memory operations that originate in CPU 102. System coherent memory, discussed with the description of FIG. 4D below, and APD coherent memory, discussed with the description of FIG. 4E below, can use this approach to memory attributes.

C8. Memory allocated to an example memory heap can beneficially be "pinned" memory. As used typically herein, a pinned block of memory is marked as unmovable, that is, not subject to the standard types of performance-based moving performed by aspects of computer arrangement 220. Pinning is used, for example, so that unmanaged code can use managed pointer types without having the data moved unexpectedly. For example, pointers for passing buffer references to Win32 API functions can be invalidated if the referenced buffer is relocated in memory without the knowledge of the Win32 API.

Example characteristics C1-C8 described above are used below to describe example memory heaps used in the UCS. As would be appreciated by one having skill in the relevant art(s), given the description herein, characteristics noted above can have additional implementation-specific aspects, and additional or fewer characteristics can apply to an embodiment of a memory heap.

One approach to accessing memory heaps is to use a memory instruction mapper (mapper 245) to map to memory heaps 250 using shared memory address space 240. Memory heaps 250 mapped into shared memory address space 240 by embodiments, can be accessed by a memory reference in a memory instruction from application 211. The memory instruction defines the address space. An example of a mapper 245 that can be used by embodiments is detailed in the Virtual Memory Application, noted above.

In an embodiment, memory heaps 250 in the UCS each are referenced by a range of addresses in shared memory address space 240 to which they are mapped. Memory operations executed by CPU 102 or APD 104 can reference an address in shared memory address space 240, such address being mapped to a memory heap, and memory resources can be provided to application 211 via the mapped heap.

Memory heaps 250 that are accessible by a unique shared address in shared memory address space 240, allow pointers to be passed directly between CPU 102 and APD 104 without modification. Memory heaps 250 that are accessible by addresses in shared memory address space 240 enable beneficial results, for example, allowing pointers to be stored in generic pointer containers native to a given language, e.g., the void container in the C++ programming language.

Figure 3:
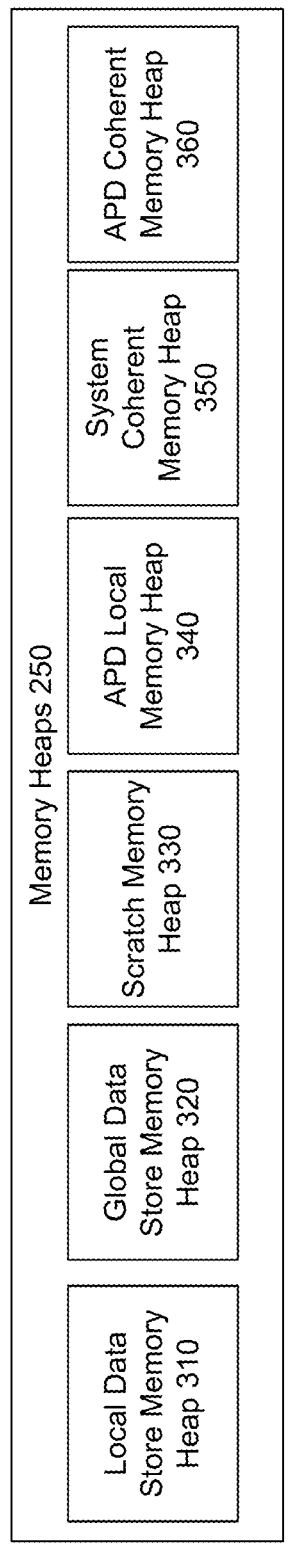
FIG. 3 is a more detailed block diagram of the memory heaps illustrated in FIG. 2, in accordance with embodiments of the invention.

FIG. 3 depicts memory heaps 250 in further detail, according to an embodiment. Memory heaps 250 includes local data store memory heap 310, global data store memory heap 320, scratch memory heap 330, APD local memory heap 340, system coherent memory heap 350, and APD coherent memory heap 360.

Example memory heaps 310-360 listed above are intended to be a non-limiting list of example memory heaps that can be used with embodiments. Each example memory heap is detailed below, with example characteristics discussed. As would be appreciated by one having skill in the relevant art(s), given the description herein, without departing from the spirit of embodiments herein, any characteristic noted below can be beneficially varied based on implementation-specific factors. Additional memory heap structures may also be used by embodiments, having characteristics detailed herein, as well as other beneficial characteristics.

It also should be appreciated that the location of memory heaps 250 in computer arrangement 220 is implementation specific, and can vary in different embodiments. Though depicted as discrete blocks in FIG. 3, the approaches described with embodiments of memory heaps herein can be logically implemented in other components of computer arrangement 220, e.g., IOMMU 116, TLB 118, memory controller 140, system memory 106, APD 104 and CPU 102.

FIG. 4A depicts a more detailed view of computer arrangement 401 according to an embodiment. Computer arrangement 401 includes application 480, APD 104, CPU 102, shared memory address space 490, GPUVM 412, IOMMU 417, system memory manager 422, system memory page tables 424, APD memory 415, system memory 425 and memory heaps—global data store memory heap (GDS memory heap 320) and local data store memory heap LDS memory heap 310.

Page tables 442 are shown as exchanged between IOMMU 417 and system memory page tables 424 via connection 440. Couplings with solid lines are used to exchange information between components in some embodiments illustrated by FIG. 4A. Couplings with dotted lines are used to exchange information in some embodiments, but not in embodiments depicted on FIG. 4A. The use of dotted and solid lines on FIG. 4A is meant to be illustrative of the use of a coupling by an embodiment. As would be appreciated by one having skill in the relevant art(s), given the description herein, couplings depicted can have different uses, additional couplings can be used, and couplings shown may not exist in embodiments.

In an embodiment, LDS memory heap 310 is a private memory region that is directly accessible only to APD 104—i.e., not directly accessible to CPU 102. In an embodiment, if CPU 102 attempts to reference an address in shared memory address space 490 that is mapped to LDS memory heap 310, CPU 102 is required to take a protection fault. In an embodiment, to avoid this type of protection fault, library calls can be supplied application 480 to guide and control shared address references by processing resources.

In another embodiment, application 480 is prevented from using CPU 102 to reference shared memory addresses allocated to memory heaps 250 that are only accessible to APD 104. Similarly, in another embodiment, application 480 is prevented from using APD 104 to reference shared memory addresses allocated to memory heaps 250 that are only accessible to CPU 102. In either case, page faulting is the mechanism used to prevent reference to the shared memory addresses.

In an example of the operation of LDS memory heap 310, an APD 104 memory operation references an address in shared memory address space 490 and this address is mapped by mapper 245 to LDS memory heap 310. LDS memory heap 310 then uses a memory manager to access different memory resources in computer arrangement 401. In an embodiment, LDS heap 310 uses a memory manager that is associated with APD 104, such memory manager having access to both memory resource associated with APD 104 (APD memory 415) and memory resources associated with CPU 102 (system memory 425).

According to an embodiment, a memory manager that is associated with APD 104 and accesses both APD memory 415 and system memory 425 is an IOMMU 417. One approach taken to access system memory 425, used by an embodiment of IOMMU 417, uses replicated system memory page tables 424. Page tables 442 are exchanged via connection 440, updating page tables in a fashion that would be appreciated by one having skill in the relevant art(s), given the description herein.

As described in FIG. 1A above, IOMMU 417 includes logic to perform virtual to physical address translation for memory page access for devices including APD 104. One approach used by IOMMU 417 to enable the use of shared memory address space 490, uses full system memory page tables 424 to allow conventional x86 user code and APD 104 code to share the same memory page tables. Because of this page table sharing, in an embodiment, a APD 104 context can use the format of a standard x86 user context. Using IOMMU 417, each APD 104 context can participate fully in system memory page tables 424 paging translations, protections and permissions.

Using IOMMU 417, APD 104 is also enabled to use standard TLB translation caching techniques, according to an embodiment. In an embodiment, because of this expanded use of system memory page tables 424 by embodiments, operating system 108 from FIG. 1, may be required to propagate page invalidations and page table flushes to IOMMU 417, e.g., using pages tables 442 via connection 440.

In an embodiment, LDS 310 is private to an APD 104 work-group, the size and memory resources used by the LDS memory heap 310 varying based on the application with which the memory heap is associated, application 480. Because of the allocation of memory for application 480, LDS memory heap 310 can be termed a "compiler managed" data heap. In an embodiment, memory in memory resources accessed by LDS 310 is pinned memory.

As further shown in FIG. 4A, global data store memory heap (GDS memory heap 320) has similar characteristics to LDS memory heap 310. In an embodiment, GDS memory heap has the same characteristics noted with respect to LDS memory heap 310, with at least one difference: Unlike LDS memory heap 310, which is private to a single APD 104 work-group, GDS memory heap 320 can be used by multiple work-groups in a single application, e.g., application 480.

Figure 4B:
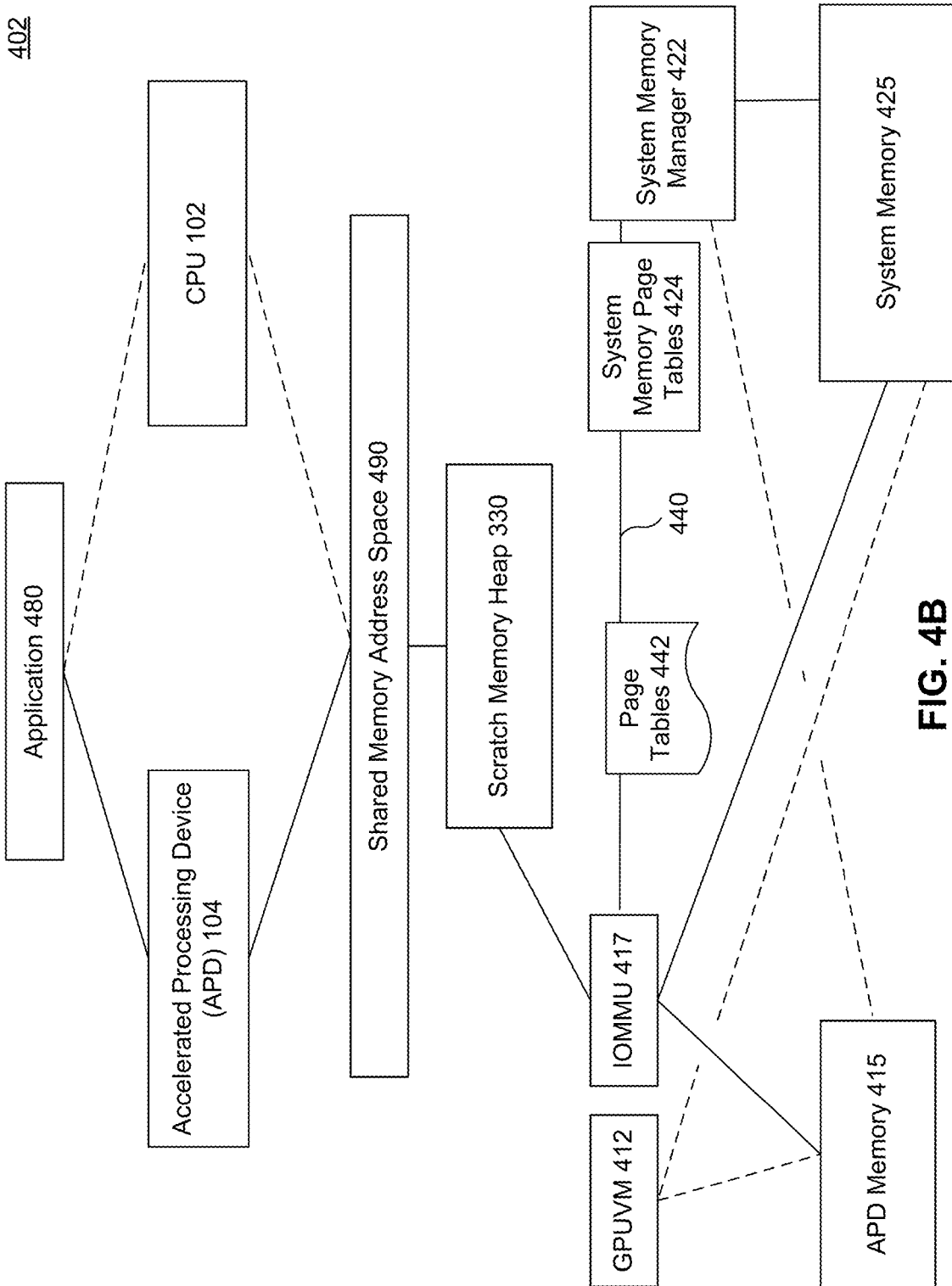
FIG. 4B is a block diagram illustrating aspects of a scratch memory heap, according to an embodiment of the invention.

FIG. 4B depicts a more detailed view of computer arrangement 402 according to an embodiment. Computer arrangement 402 includes application 480, APD 104, CPU 102, shared memory address space 490, GPUVM 412, IOMMU 417, system memory manager 422, system memory page tables 424, APD memory 415, system memory 425 and scratch memory heap 330. Page tables 442 are shown as exchanged between IOMMU 417 and system memory page tables 424 via connection 440.

Couplings with solid lines are used to exchange information between components in some embodiments illustrated by FIG. 4B. Couplings with dotted lines are used to exchange information in some embodiments, but not in embodiments depicted on FIG. 4B. The use of dotted and solid lines on FIG. 4B is meant to be illustrative of the use of a coupling by an embodiment. As would be appreciated by one having skill in the relevant art(s), given the description herein, couplings depicted can have different uses, additional couplings can be used, and couplings shown may not exist in embodiments.

In an embodiment, scratch memory heap 330 is directly accessible only to APD 104. In an embodiment, scratch memory heap 330 can be used as a per work-item extension to general purpose registers in APD 104.

One feature implemented in an embodiment of scratch memory heap 330 involves address replication. In this embodiment, shared memory addresses referenced in scratch memory heap 330 undergo a transformation so that, for each APD 104 work-item, each shared memory address can refer to a different address in a memory resource. Stated a different way, each shared memory address (SMA) that maps to scratch memory heap 330 is replicated for each APD 104 processor thread, and each replicated SMA maps to a portion of the memory resource, the portion being only accessible to the APD processor thread to which the replicated SMA is mapped.

In an embodiment, scratch memory 330 can directly access both APD memory 415 and system memory 425. In another embodiment, scratch memory heap 330 can map to other memory heaps (not shown). Example memory heaps that can be used by scratch memory heap 330 include APD local memory heap 340, APD coherent memory heap 360 and system coherent memory heap 350, each memory heap being discussed further below.

Using IOMMU 417, scratch memory heap 330 can access APD memory 415 and system memory 425. Similar to the process noted above with the description of IOMMU 417 with FIG. 4A, to access system memory 425 for scratch memory heap 330, IOMMU 417 can use page tables 442, such page tables being exchanged via connection 440.

Figure 4C:
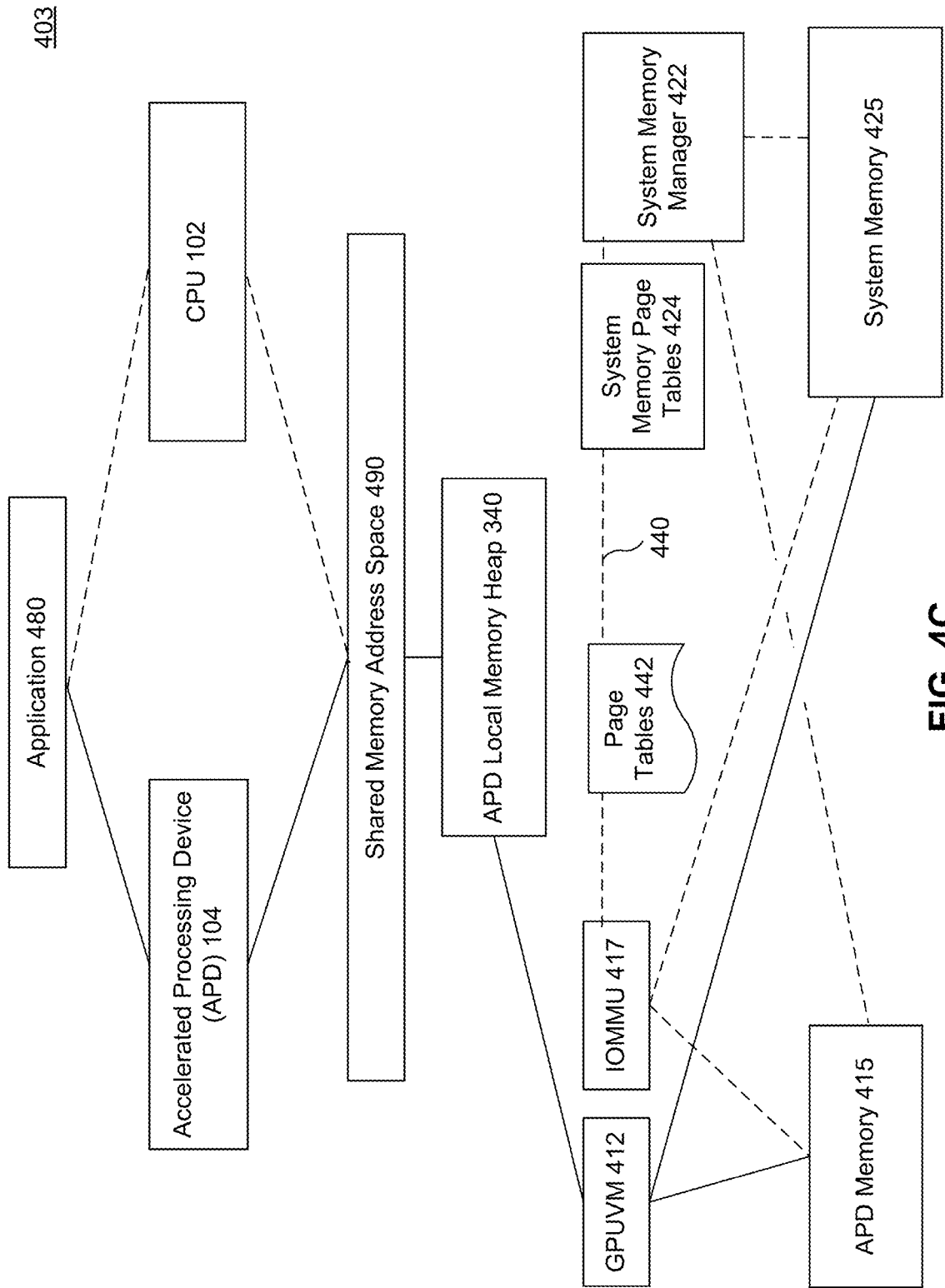
FIG. 4C is a block diagram illustrating aspects of an APD local memory heap, according to an embodiment of the invention.

FIG. 4C depicts a more detailed view of computer arrangement 403 according to an embodiment. Computer arrangement 403 includes application 480, APD 104, CPU 102, shared memory address space 490, GPUVM 412

(IOMMU 417, system memory manager 422, system memory page tables 424, APD memory 415, system memory 425 and API) local memory heap 340.

In an embodiment, this "local" memory heap is only directly accessible to API 104 and mapped using APD internal virtual memory hardware, for example GPUVM 412. In an embodiment, a portion of APD memory 415 can be allocated to APD local memory heap 340.

In another embodiment, APD local memory heap accesses system memory 425 via GPUVM 412. GPUVM 412 accesses, in an example, memory that is "unsnooped" in system memory 425. GPUVM 412 can access system memory 425 without referencing system memory page tables 424. In this example, system memory 425 has specific reserved portions for APD local memory heap 340, system memory page tables 424 table entries corresponding being marked as not present. As would be appreciated by one having skill in the relevant art(s), given the description herein, portions of system memory 425 allocated to GPUVM 412 can be termed "aperture memory."

In an embodiment, the mapping of APD local memory heap 340 to specific memory resources in APD memory 415 and/or system memory 425 does not occur until the initiation of the process threads associated with application 480.

Figure 4D:
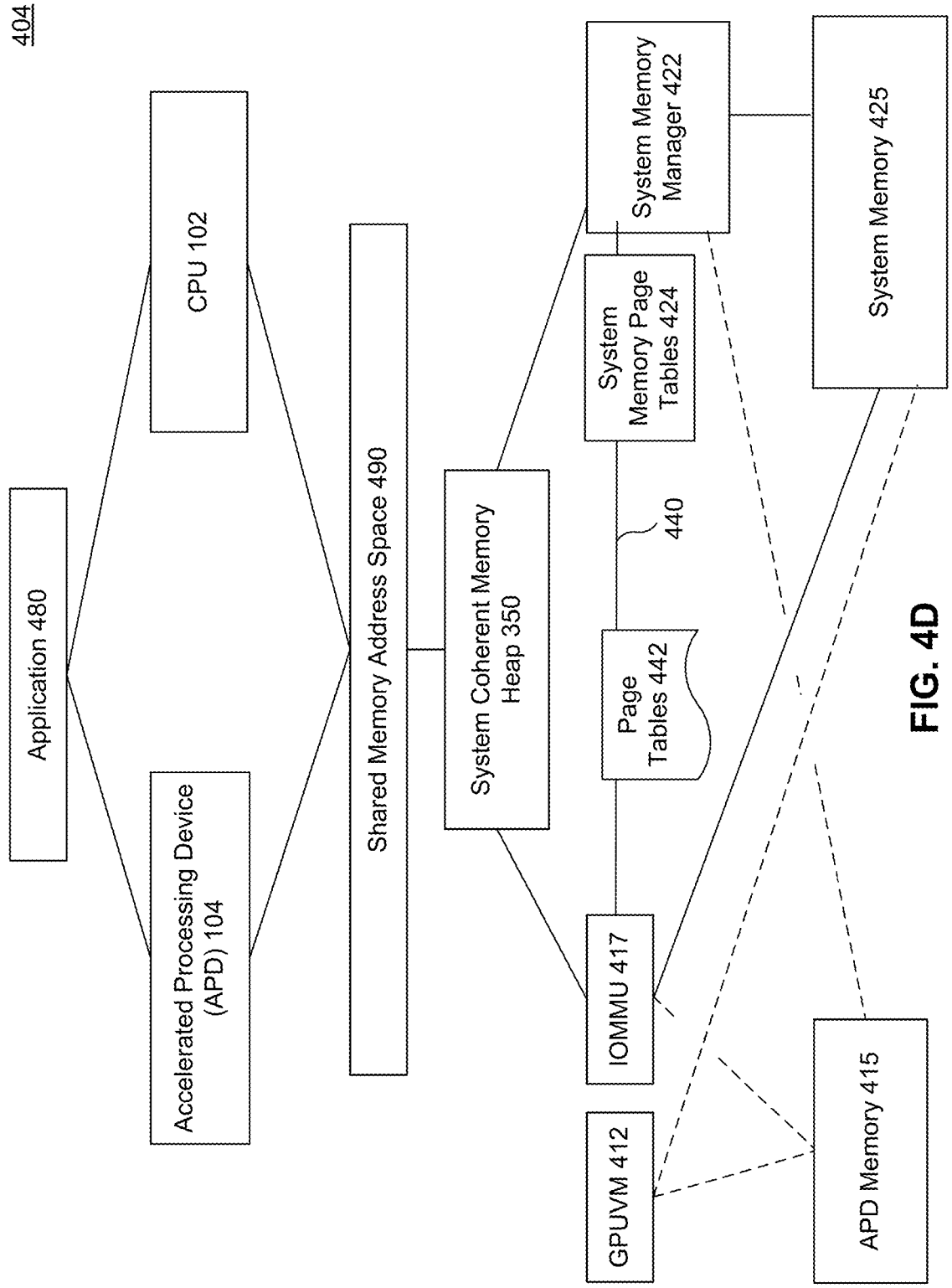
FIG. 4D is a block diagram illustrating aspects of a system coherent memory heap, according to an embodiment of the invention.

FIG. 4D depicts a more detailed view of computer arrangement 404 according to an embodiment. Computer arrangement 404 includes application 480, APD 104, CPU 102, shared memory address space 490, GPUVM 412, IOMMU 417, system memory manager 422, system memory page tables 424, APD memory 415, system memory 425 and system coherent memory heap 350. Page tables 442 are shown as exchanged between IOMMU 417 and system memory page tables 424 via connection 440.

In an embodiment, system coherent memory heap 350 is a memory region that is directly accessible by both APD 104 and CPU 102. In an embodiment, the memory manager used by system coherent memory heap 350 to access a memory resource can depend upon the processor from which the memory operation originates. For example, when a memory operation from application 480 originates at CPU 102, system memory manager 422 is used by system coherent memory heap 350 to access system memory 425. Similarly, when a memory operation from application 480 originates at APD 104, IOMMU 417 is used by system coherent memory heap 350 to access system memory 425. More specifically, IOMMU 417 is used to translate virtual addresses in system coherent memory heap 350 to physical addresses in system memory 425. System memory manager 425 controls allocation of system memory 425 and sets up system memory page tables 424 that provide the mappings between the virtual and physical addresses.

As noted with the discussion of FIG. 4A above, in an embodiment, IOMMU 417 uses replicated page tables 442 to access system memory 425. In an embodiment, the allocated memory in system memory 425 referenced by system coherent memory heap 350 is not pinned. Unlike conventional memory used by APD 104, memory resources accessed by system coherent memory heap 350 can generate standard page faults.

Figure 4E:
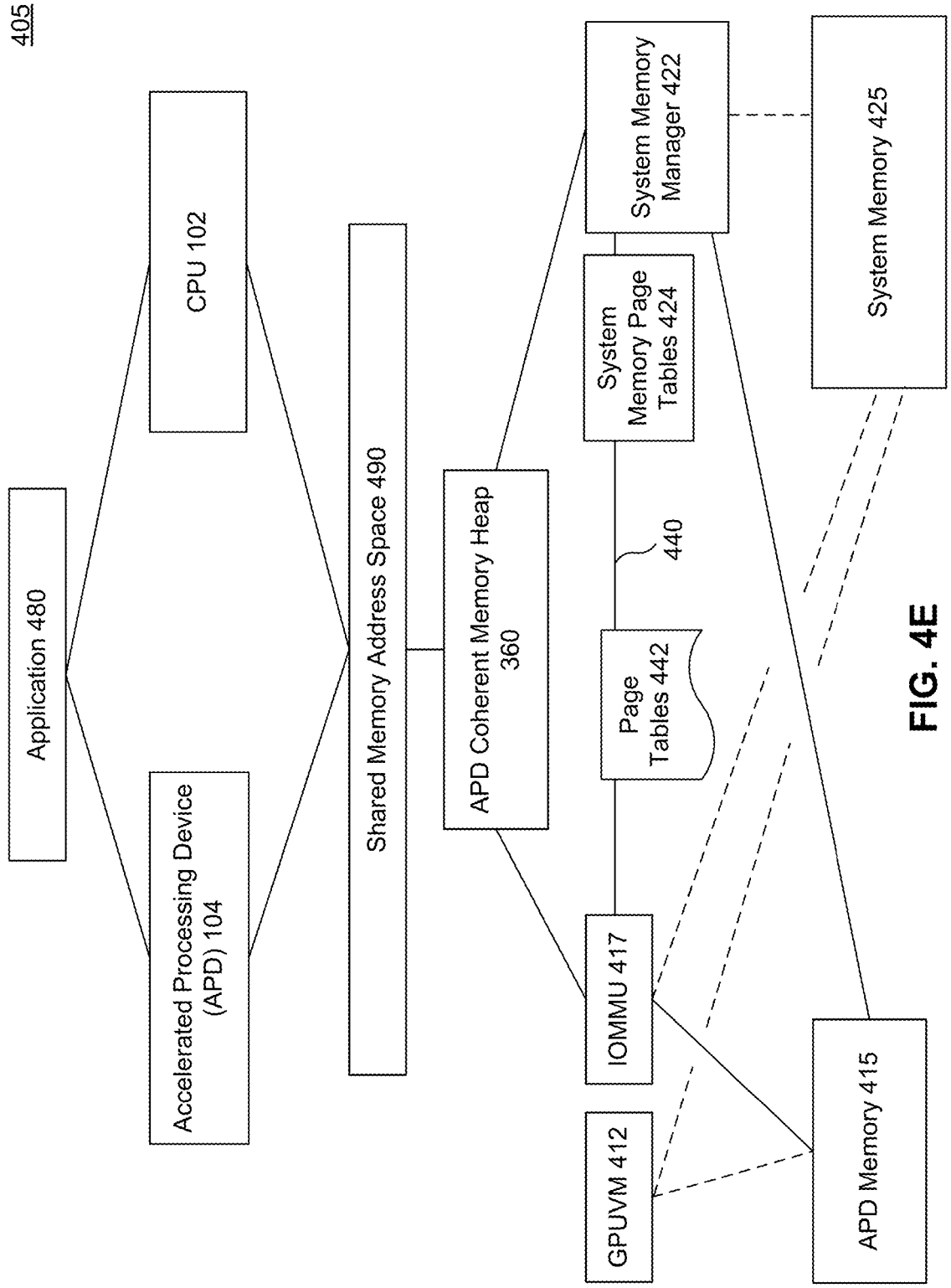
FIG. 4E is a block diagram illustrating aspects of a APD coherent memory heap, according to an embodiment of the invention.

FIG. 4E depicts a more detailed view of computer arrangement 405 according to an embodiment. Computer arrangement 405 includes application 211, APD 104, CPU 102, shared memory address space 490, GPUVM 412, IOMMU 417, system memory manager 422, system memory page tables 424, APD memory 415, system memory 425 and APD coherent memory heap 360.

Like system coherent memory heap 350 discussed with the description of FIG. 4D above, APD coherent memory heap 360 is accessible to both CPU 102 and APD 104. Unlike system coherent memory heap 350, APD coherent memory heap 360 accesses APD memory 415 instead of system memory 425.

Similar to system coherent memory heap 350 discussed above, in an embodiment, APD coherent memory heap 360 uses either IOMMU 417 or system memory manager 422 to access a memory resource. The memory manager used by APD coherent memory heap 360 to access a memory resource depends upon the processor from which the memory operation originates. For example, when a memory operation from application 480 originates at CPU 102, system memory manager 422 is used by APD coherent memory heap 360 to access APD memory 415. Similarly, when a memory operation from application 480 originates at APD 104, IOMMU 417 is used by APD coherent memory heap 360 to access APD memory 415.

Also similar to system coherent memory heap 350, memory referenced by APD coherent memory heap 360 is not required to be pinned and can generate memory page faults if referenced by page tables 424.

Figure 5:
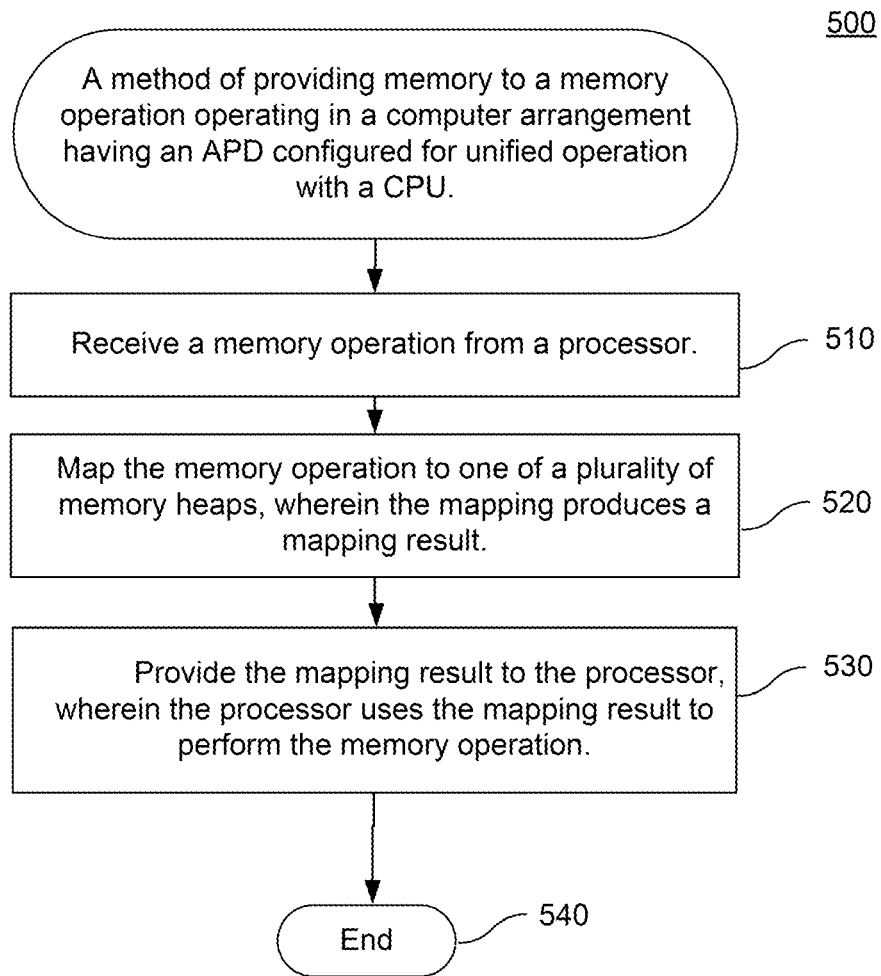
FIG. 5 is a flowchart illustrating a method of providing memory to a memory operation operating in a computer arrangement having an APD configured for unified operation with a CPU, according to an embodiment of the invention. The invention is described with reference to the accompanying drawings. The drawing in which an element first appears is typically indicated by the leftmost digit(s) in the corresponding reference number.

FIG. 5 illustrates a more detailed view of how embodiments described herein may interact with other aspects. In this example, a method 500 of providing memory to a memory operation operating in a computer arrangement having an APD configured for unified operation with a CPU, is shown.

Initially, as shown in stage 510 in FIG. 5, a memory operation is received from a processor. In one example, in an embodiment, a memory operation from an application, for example application 211 from FIG. 2, is received at mapper 245 from a processor, e.g., CPU 102. In another example, the memory operation is received at mapper 245 from APD 104.

At stage 520, the received memory operation is mapped to a one of a plurality of memory heaps, such mapping resulting in a mapping result. For example, in an embodiment, the memory operation from stage 510 is mapped by mapper 245 to a one of memory heaps 250. In another embodiment, the memory operation includes a reference to shared memory address space 240, and mapper 245 uses the reference to map to memory heaps 250.

At stage 530, the mapping result is provided to the processor, and the processor uses the mapping result to perform the memory operation. For example, in an embodiment, mapper 245 provides a mapping result to a processor, for example CPU 102. In another example, the mapping result is provided to APD 104. After stage 530, method 500 ends.

Embodiments described herein relate to providing memory to a memory operation in a computer arrangement. The summary and abstract sections may set forth one or more but not all exemplary embodiments of the present invention as contemplated by the inventors, and thus, are not intended to limit the present invention and the claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A method for allocating memory in a computer system having a plurality of processors, the method comprising:
receiving a memory operation from a processor that references an address in a shared memory;
mapping the received memory operation to at least one virtual memory pool to produce a mapping result, wherein the at least one virtual memory pool is associated with at least one memory resource; and
providing the mapping result to the processor.

2. The method of claim 1, wherein the mapping of the received memory operation to the at least one memory pool to produce a mapping result depends on the processor from which the memory operation originated.

3. The method of claim 1, further comprising performing, by at least one of the plurality of processors, the memory operation using the mapping result using memory resources.

4. The method of claim 1, wherein the memory operation is a memory access request for a shared memory address.

5. The method of claim 1, wherein each virtual memory pool is associated with at least one memory resource.

6. The method of claim 1, wherein the at least one virtual memory pool is associated with only one physical memory resource.

7. The method of claim 1, wherein the at least one virtual memory pool is associated with a plurality of physical memory resources.

8. The method of claim 1, wherein the at least one virtual memory pool is not accessible by one processor of the plurality of processors.

9. The method of claim 1, wherein the at least one virtual memory pool is accessible by all processors of the plurality of processors.

10. The method of claim 1, wherein the at least one virtual memory pool is accessible only by a specific type of processor.

11. A computer system comprising:
a plurality of processors;
a shared memory; and
a mapper, wherein the mapper is configured to:
receive a memory operation from a processor that references an address in the shared memory;
map the received memory operation to at least one virtual memory pool to produce a mapping result, wherein the at least one virtual memory pool is associated with at least one memory resource; and
provide the mapping result to the processor.

12. The computer system of claim 11, wherein the mapping of the received memory operation to the at least one virtual memory pool to produce a mapping result depends on the processor from which the memory operation originated.

13. The computer system of claim 11, wherein at least one of the plurality of processors is configured to perform the memory operation using the mapping result.

14. The computer system of claim 11, wherein the memory operation is a memory access request for a shared memory address.

15. The computer system of claim 11, wherein each virtual memory pool is associated with at least one memory resource.

16. The computer system of claim 11, wherein the at least one virtual memory pool is associated with only one physical memory resource.

17. The computer system of claim 11, wherein the at least one virtual memory pool is associated with a plurality of physical memory resources.

18. The computer system of claim 11, wherein the at least one virtual memory pool is not accessible by one processor of the plurality of processors.

19. The computer system of claim 11, wherein the at least one virtual memory pool is accessible by all processors of the plurality of processors.

20. The computer system of claim 11, wherein the at least one virtual memory pool is accessible only by a specific type of processor.

* * * * *